(12) United States Patent
Vikiö

(10) Patent No.: US 6,605,184 B1
(45) Date of Patent: Aug. 12, 2003

(54) METHOD AND APPARATUS FOR TREATMENT OF FIBER SUSPENSION CONTAINING MINERALS, SUCH AS COATED BROKE, IN PAPER PRODUCTION

(75) Inventor: Pentti Vikiö, Karhula (FI)

(73) Assignee: Andritz Oy, Helsinki (FI)

( * ) Notice: Subject to any disclaimer, the term of this patent is extended or adjusted under 35 U.S.C. 154(b) by 0 days.

(21) Appl. No.: 09/623,876

(22) PCT Filed: Mar. 12, 1999

(86) PCT No.: PCT/FI99/00186

§ 371 (c)(1),
(2), (4) Date: Oct. 5, 2000

(87) PCT Pub. No.: WO99/46442

PCT Pub. Date: Sep. 16, 1999

(30) Foreign Application Priority Data

Mar. 12, 1998 (FI) .................................................. 980554

(51) Int. Cl.⁷ .............................. D21F 1/66; D21C 5/02; D21D 5/00
(52) U.S. Cl. .............................. 162/191; 162/4; 162/55; 209/12; 209/17; 209/725; 241/24.1; 241/24.15; 241/28
(58) Field of Search .................... 162/4–9, 55, 189, 162/191; 209/10, 12.1, 17 R, 724–725, 728–729.3; 241/24.15, 55, 28, 24.1, 24.12

(56) References Cited

U.S. PATENT DOCUMENTS

| | | | | |
|---|---|---|---|---|
| 4,167,438 A | * | 9/1979 | Holz | 162/4 |
| 4,200,486 A | * | 4/1980 | Vagac et al. | 162/8 |
| 4,416,727 A | * | 11/1983 | Elton et al. | 162/6 |
| 4,504,016 A | * | 3/1985 | Wikdahl | 241/24.21 |
| 5,017,268 A | * | 5/1991 | Clitherow et al. | 162/146 |
| 5,131,982 A | * | 7/1992 | John | 162/168.2 |
| 5,466,338 A | * | 11/1995 | Pearson | 162/168.2 |
| 5,776,304 A | * | 7/1998 | Vikio | 162/4 |
| 5,837,100 A | * | 11/1998 | Gerli et al. | 162/168.2 |
| 5,996,806 A | * | 12/1999 | Vikio | 209/10 |
| 6,223,904 B1 | * | 5/2001 | Stephan et al. | 209/3 |

FOREIGN PATENT DOCUMENTS

| | | |
|---|---|---|
| CA | 2094809 | 4/1992 |
| CA | 2250475 | 1/1998 |
| WO | WO 95/04189 | 2/1995 |
| WO | WO 96/27706 | 9/1996 |

* cited by examiner

Primary Examiner—Jose A. Fortuna
(74) Attorney, Agent, or Firm—Nixon & Vanderhye P.C.

(57) ABSTRACT

A method and apparatus treat fiber based material so as to reduce the loss of mineral fractions in the treatment of broke in paper production. Broke is a reusable raw material from a paper machine that contains mineral fractions which are desirably returned to the process as a raw material. The material containing minerals is dispersed into broke pulp, which is fractionated, and the accepts from the fractionation are returned to the paper manufacturing process providing for efficient and economical recovery of the minerals in broke. The mineral fraction provided in the rejects from the fractionation is treated separately before it is reused as filler or coating material in the production of paper or board.

24 Claims, 4 Drawing Sheets

METHOD AND APPARATUS FOR TREATMENT OF FIBER SUSPENSION CONTAINING MINERALS, SUCH AS COATED BROKE, IN PAPER PRODUCTION

CROSS-REFERENCE TO RELATED APPLICATION

This application is the U.S. national phase of PCT/FI99/00186 filed Mar. 12, 1999.

BACKGROUND AND SUMMARY OF THE INVENTION

The present invention relates to a method of reducing the loss of mineral fractions in the treatment of broke in paper production. The invention relates in particular to the treatment of the so-called broke from a paper machine, which is reusable raw material, so that as much of the mineral fractions the broke contains may be returned to the process and used as raw material for paper as efficiently and economically as possible.

The term broke means unsaleable paper, which usually may be returned to the paper manufacturing process to be used as raw material. The volume of broke from a paper machine is usually about 5–40% of the production of the machine; thus the share is quite remarkable. Broke comes up in different forms and various amounts of it are produced at different locations in the paper machine: at the wire section in edge trimming, when the web is broken, at the coater and the slitter in trimming the edges, as surface and bottom broke of reels and as broke reels. The main function of the broke system is to disperse the broke pulp coming from the paper machine and to return it to the process.

Generally the broke from a paper machine is dispersed in pulpers as required and the broke pulp flows from the pulpers are guided to a broke chest. The pulp is guided from the broke chest via consistency adjustment to the mixing tank of the paper machine.

A little more advanced treatment of broke typically comprises dispersing, storing, thickening, screening and defiberizing/deflaking of the broke and dosing it back to the paper production for use as raw material. One application is the following approach. Broke paper is dispersed in machine pulpers to pumpable form (consistency 4.0–5.5%). As the pulp dispersed in the pulper contains non-defiberized paper flocs the broke pulp must still be defiberized after storing before it is recycled to the process. Part of the paper machine broke (for example trimmings from the wire) is returned to the broke system at a low consistency. For this reason, the broke system must include concentration of the broke in order to prevent the storage capacity required from increasing unnecessarily high.

Broke is dispersed in pulpers disposed at the paper machine and at the finishing treatment. Paper pulp coming from different pulpers is usually collected to a wire pit disposed under the wire section from which the broke is transported via a broke tower to a pressure screen, which separates fiber bundles and impurities from the pulp. Reject from the pressure screen is guided to a vibrating screen and accept from this is guided back to the broke tower. Reject from the vibrating screen is discharged from the system. The fraction, which has passed through the pressure screen in the broke line, is pumped to a broke concentrator, which raises the consistency of the broke to the level of 4% required by the dosing system. The concentrated pulp is transported from the broke concentrator to a dosing tank from which the broke pulp is pumped via defiberizers to the mixing tank of the paper machine.

The system and method of treating broke described above is the same irrespective of the place where the broke is produced; thus, problems are caused by the different kinds of broke. Present broke treatment systems face problems mostly with coated broke. Paper machines producing coated grades require a separate treatment system for coated broke or at least a separate storing for dosing the broke at the proportion desired. The ash content (the term used for minerals and fillers) of coated broke is higher than the ash content of base paper and thus, if dosed unevenly, it causes fluctuations in the filler content of the base paper. Coated paper is also more difficult to disperse and therefore it often requires a treatment of its own which discharges the non-dispersed fraction from the pulp and returns it to the dispersion treatment. Further, the coating layer of coated broke is not dispersed fine enough by the present broke treatment but remains partly non-dispersed as flakes which, being large fractions, are rejected later in the process, i.e. in the hydrocyclones of the short circulation. The composition of this rejected pigment fraction would allow utilizing it as raw material for paper, but its particle size is too coarse.

The same applies also to recycled pulp systems which use coated magazine paper and other richly coated recycled pulp as raw material for recycled pulp. In recycled pulp dispersing systems, the coating pigment of the coated paper detaches from the fiber layer of the paper itself more or less as sheet-like fractions, which are partly dispersed by the process. The dispersion is, however, not complete and thus these non-dispersed coating pigment particles are discharged from the process as reject from the hydrocyclone cleaning in the screen room. However, most of the particles rejected have a raw material composition, which would allow using them in paper production as filler; filler may have to be added to the fiber suspension at a later stage of the paper manufacture. The size of these particles, however, causes problems at the paper machine itself if the particles are not disintegrated and thus made acceptable for use as filler.

An improvement in the prior art technology was provided by an approach disclosed in Finnish patent application no. 960351 according to which the filler/mineral fraction loss discharged as mill reject from hydrocyclone cleaning is reduced by treating the fraction, the mineral fraction content of which has been concentrated, in connection with the hydrocyclone plant in order to disintegrate the mineral fractions and to return them to the process. The method and the apparatus of the invention provide for example the following advantages: losses of fillers/minerals, water, chemicals, heat and fibers reduce; only the unusable fraction and the fraction, which cannot be converted usable, is discharged from the process in a highly concentrated form; the system is a continuous part of the short circulation or the screening system of a paper machine; in other words, the process conditions are constant and the operation free from disturbances. Further, the process is self-adjusting. For example, if the volume of the coarse fraction introduced into the system increases the system recycles to the process only the fraction it is capable of disintegrating and the rest is discharged from the system.

Thus, present methods employ treatment of the solid material rejected from the hydrocyclone cleaning plant of a paper machine short circulation. The prior art has, however, a few drawbacks. Particularly at paper machines producing large volumes of reject, such as machines manufacturing base paper for coating and/or machines using coated broke, the fractions rejected in the hydrocyclone cleaning originate from the coated broke. These rejected fractions are mainly non-disintegrated coating layer, i.e. coating flakes. The share in the pulp of fractions rejected during the hydrocyclone cleaning is quite high and this loads and wears out the hydrocyclone apparatus. As the volume rejected in the hydrocyclone cleaning is high, the solids losses become high despite the use of the treatment apparatus and cause raw material, transport, dump etc. costs in addition to the wearing of the apparatus. Further, the ash content of coated broke is higher than that of base paper which, with uneven dosing, results in fluctuations in the filler content of the base paper. Also, in the present approaches, which treat mineral fractions, pulps from different sources, such as paper machine broke, recycled paper and broke from the pulp section, are combined and treated in the same hydrocyclone plant. Then, the pulps having different filler contents are mixed with each other and the entire pulp volume must be treated in order to separate the coarse fractions.

A problem essentially influenced by the present invention is the operation and wearing of the short circulation apparatus. Another problem solved by the present invention is connected with the fluctuations in the filler content of base paper caused by the dosing of coated broke. The approach according to the invention essentially reduces the amount of filler-containing reject rejected in a hydrocyclone plant and to be transported to a dump. Also the volume of pulp to be treated to separate the mineral fraction reduces remarkably.

A preferred embodiment of the present invention is based on treatment of coated broke so that pigment flakes are separated/fractionated from dispersed coated broke to a separate treatment and thus disintegrated before the broke is returned to the paper machine mixing tank. In this way, the amount of the fraction rejected in the hydrocyclone cleaning reduces essentially because the pulp does not contain rejectable coating flakes. At the same time, the ash content of the pulp is more accurately controllable as the mineral fraction has been removed from the broke before the broke is guided to the paper machine mixing tank.

Pigment and mineral material in this application means all pulp coating materials. When mineral fraction is referred to it means coating flakes requiring more efficient treatment in order to be disintegrated.

The method of the present invention provides for example the following advantages:

Solids losses in the hydrocyclone cleaning are essentially reduced as the pulp does not contain anymore as much large coating flakes from coated broke as before.

The load of the hydrocyclone cleaning is reduced as the share of coarse rejectable fractions in the pulp is reduced. Then the hydrocyclone cleaning works better and more efficiently.

The runnability of the hydrocyclones is improved and the risk of clogging is reduced.

Wearing of the short circulation apparatus is reduced.

When the concentration of the pigment from the coated broke is high the pigment may be stored, transferred or even transported to another mill. In this way all the raw material may be utilized and no solid material usable as raw material need be transported to a dump.

After separation of the fiber fraction and the coating fraction, or fractionating, more attention can be focused on the treatment of the fiber part of the coated broke and the fiber properties of the broke may be optimized.

Wearing of the apparatus used for treatment of fiber, such as defibrators, is reduced as the mineral fraction has been separated/removed.

The treatment is advantageous as the volume of the pulp to be treated is remarkably reduced when, in order to disintegrate the mineral fraction, only the coated broke, or pulp having essentially a high content of coarse mineral fraction, need be treated and not all the pulp treated in the short circulation and coming to the paper machine.

The investment costs of the system are low. The invention is technically carried out with known commercial apparatus and the repayment period is short.

The system is easy to carry out, i.e. it is easily added to existing broke treatment systems.

The characteristic features of the invention become apparent in the enclosed patent claims.

BRIEF DESCRIPTION OF THE DRAWINGS

The method and the apparatus of the present invention are described more in detail below, by way of example, with reference to the accompanying drawings, in which.

DETAILED DESCRIPTION OF THE DRAWINGS

Figure 1A:
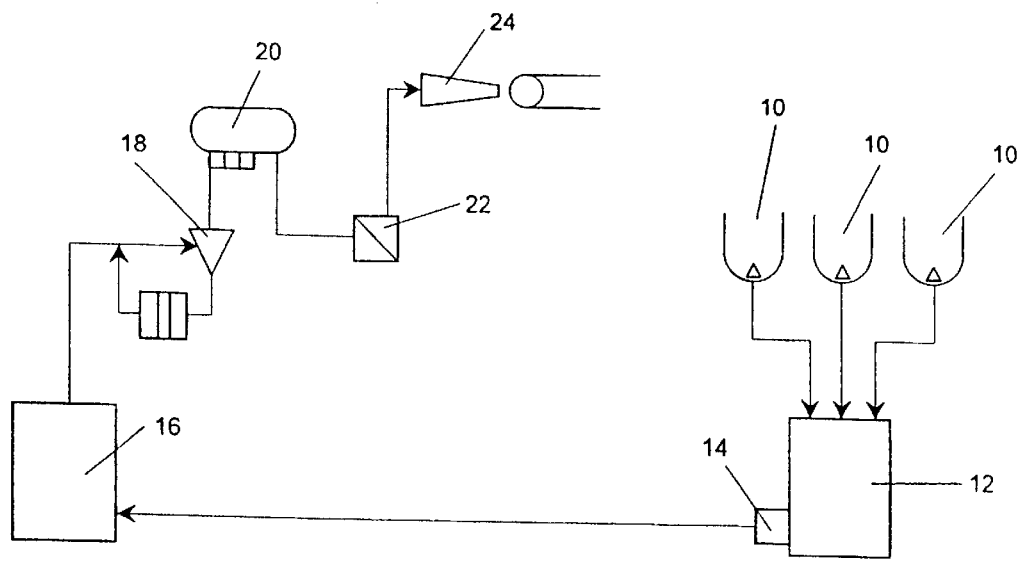
FIGS. 1a, 1b and 1c illustrate three prior art apparatus.

FIG. 1a illustrates a broke treatment system. Usually, the broke from a paper machine is dispersed as needed in pulpers 10, from which broke flows are guided to a broke chest 12. From the broke chest, pulp is guided via consistency adjustment 14 directly to a mixing tank 16 of the paper machine in which tank the pulp to be fed to the paper machine is mixed either entirely or in the proportion desired from new pulp, recycled pulp and broke and fillers. Mixed pulp is further directed via hydrocyclone plant 18 to a gas separation tank 20, a so-called DECULATOR®, and therefrom further via a so-called head box screen 22 to a head box 24 of the paper machine.

A little more advanced broke treatment system contains typically dispersing, storing, thickening, screening and defiberizing/deflaking and dosing of the broke for reuse as raw material in paper production. One application comprises the following approach. Broke paper is dispersed in machine pulpers 10 to pumpable form (consistency 4.0–5.5%). As the pulp dispersed in the pulper still contains non-defiberized paper flocks the broke pulp must still after storing be defiberized before it is recycled to the process. Part of the paper machine broke (trimmings from the wire) is returned to the broke system at a low consistency. For this reason, the broke system must contain concentration of the broke in order to prevent the storage capacity from increasing unnecessarily high.

Broke is usually dispersed in pulpers 10 located at the paper machine and the finishing treatment, for example at a fine paper machine at the following locations: the wire pit at the wire section, the press pulper, the size press pulper, the machine pulper at the Pope of the paper machine, the pulper of the slitter, the slitter trimmings pulper, the broke reel pulper and the broke reel pulper of the finishing room. Paper pulp from various pulpers 10 is usually collected to a wire pit under the wire section. Broke is guided from the wire pit in a centralized manner to a broke tower 12. From the broke tower 12, broke is pumped to a pressure screen 30, which separates larger fiber bundles and impurities from the pulp. Reject from the pressure screen is taken to a vibrating screen 32, and its accept is further returned to the broke tower 12. Reject from the vibrating screen is discharged from the system. The fraction which has passed through the pressure screen 30 of the broke line is pumped to a broke concentrator 34 where the consistency of the broke is raised to 4% required by the dosing system. The concentrated pulp from the broke concentrator 34 is guided to a broke dosing tank 36, from which the broke pulp is pumped through defiberizers 38 to the mixing tank 16 of the paper machine. From this point on the process is similar to the one in FIG. 1a.

In paper machines producing coated paper, the coating machine is located after the paper machine prior to the slitter. Its broke treatment system differs from the one described above in that the broke from the pulpers 10' following it, i.e. from the slitter pulper, the trimmings pulper of the slitter, the broke reel pulper and the broke reel pulper of the finishing room, is collected to a separate tank 11'. Pulp is dosed in the desired proportion from the wire pit 11 and the coated broke tank 11' to the broke tower 12.

Figure 1B:
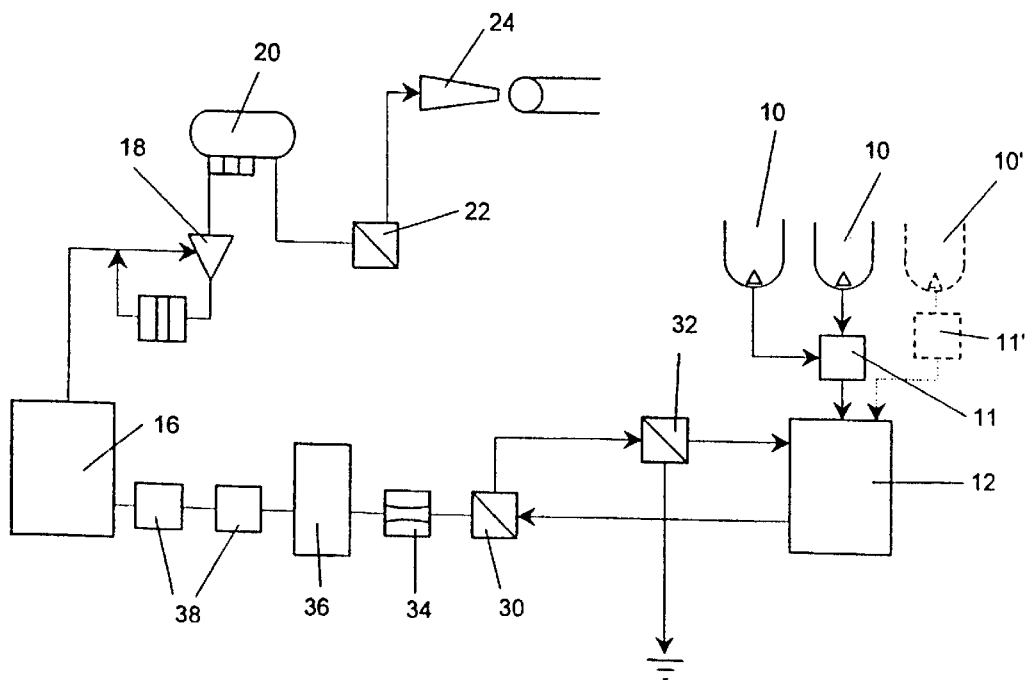
Figure 1C:
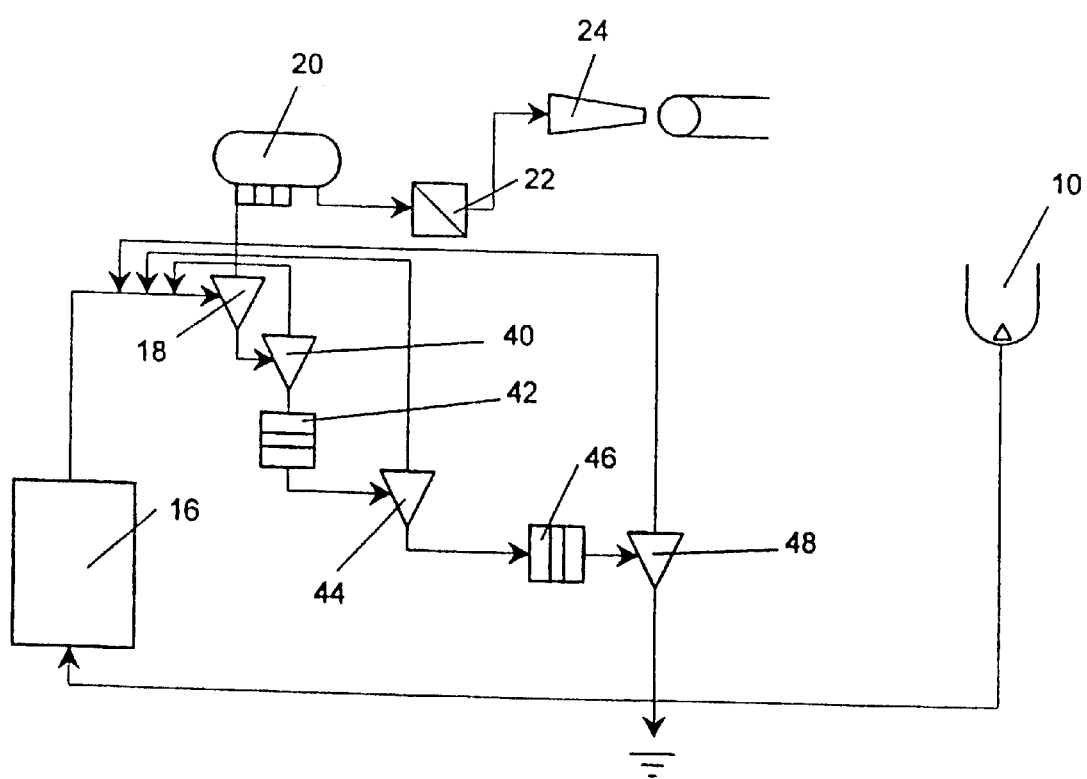

An example of a prior art method of reducing the filler loss is an approach disclosed in Finnish patent application no. 960351, FIG. 1c. In this approach, the filler loss is reduced by treating the flow leaving the process for example in an apparatus as illustrated in FIG. 1c. The broke pulp brought to the mixing tank of the paper machine and from there to the hydrocyclone cleaning plant comes also in this method most commonly from the broke treatment systems described above in FIGS. 1a and 1b. In the apparatus of FIG. 1c, the material to be treated is obtained as reject from the last step of the short circulation hydrocyclone treatment plant 18. Preferably and alternatively the reject is guided to a first reject fractionating stage 40, and the fine material separated therein is returned to the pulp prior to the hydrocyclone cleaning plant 18, and the coarse fraction is guided to a disintegrating apparatus 42, and after the disintegrating stage performed therein the material is diluted and fed into the next cleaner 44. The fine material separated in the cleaner 44 is recycled to the hydrocyclone plant 18 for treatment and the reject is disintegrated in a disintegrator 46 after which it is transported to a third cleaner 48, from which the accept is fed for reuse and the reject is discharged from the process.

It is a characteristic feature of this and all other known methods that they treat the fine material only in connection with the hydrocyclone plant and not where the fraction is returned to the process or before the return, or that they discharge the rejected mineral fraction from the process altogether. According to prior art methods, the pulps obtained from all the different sources, such as paper machine broke, recycled paper and pulp from the pulp section, are combined and treated in one and the same hydrocyclone plant. Then pulps having different filler contents are mixed and the entire pulp volume has to be treated in order to separate the coarse fraction contained therein.

Figure 2:
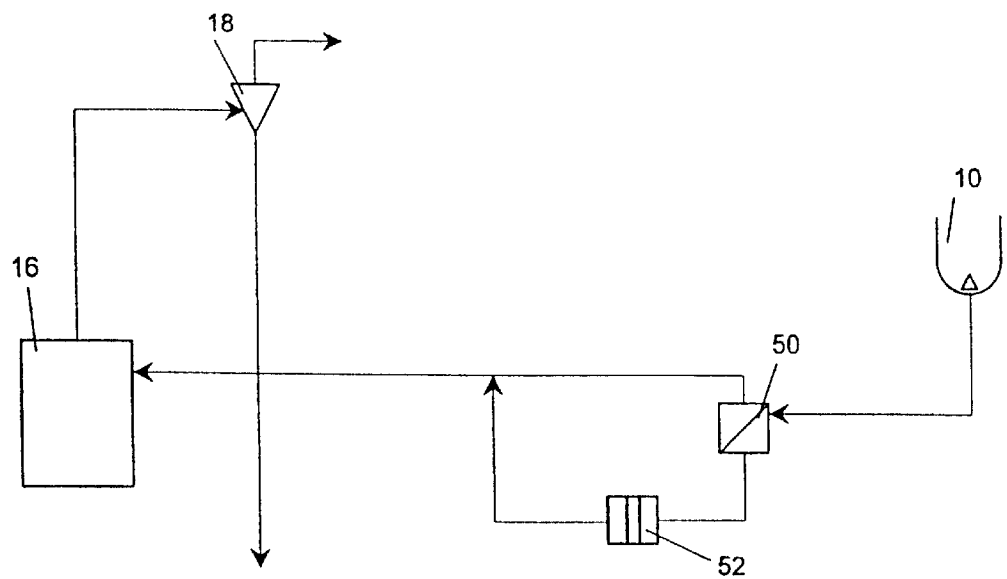
FIG. 2 illustrates a broke treatment system according to a preferred embodiment of the invention.

According to a preferred embodiment of the invention illustrated in FIG. 2, a broke treatment system comprises the following stages: dispersing the broke to broke pulp, fractionation, and disintegrating the coating flakes. The broke is dispersed to pulp in one or several pulpers 10 from which broke pulp is guided to fractionation 50. During the fractionation, the coating flakes are separated from the rest of the broke pulp disrupted from the coated broke, i.e. mainly fibers. The accepted fiber fraction is further guided to the paper manufacturing process. The mineral fraction, in this case non-dispintegrated coating flakes and other ash-containing fine material such as filler and retention material, is rejected. The fractionation may be carried out with apparatus of the corresponding kind that are used to wash ash from recycled pulp, such as a wire washer, a fractionating pressure screen, for example Ahlsdecker, a curved screen, a vibrating screen or a vortex separator. The stage following the separation of fiber and mineral fractions is disintegration 52 of the coating flakes. Disintegrated pigment fraction is no longer rejected in the hydrocyclone cleaning 18 of the paper machine. The disintegration may be carried out with existing commercial grinders, such as a ball mill or a steel disperser having either one or several stages. The dispersed pigment fraction is recycled to the paper manufacturing process.

When the disintegrated pigment fraction is recycled to the paper manufacturing process, no fresh filler is necessarily needed for filler adjustment, or the volume of fresh filler can at least be reduced. The whole volume of treated pigment fraction obtained from coated broke may be reused.

In order to intensify fractionation in the dispersion of the broke to broke pulp, also other fiberizing apparatus may be used in addition to pulpers. In this way the fibers and the mineral material is more reliably separated from each other during fractionation and thus the fractionator is more easily capable of separating the pulp into fiber fraction and into mineral fraction and no mineral material which would pass on with the fiber fraction, remains attached to the fibers.

In this embodiment, as also in any other embodiment of the invention, the broke pulp may naturally be stored before it is transferred to fractionation. Storing levels out the fluctuations caused by uneven production of broke. By dosing broke pulp from a store, constant flow is provided to the broke treatment process.

Figure 3:
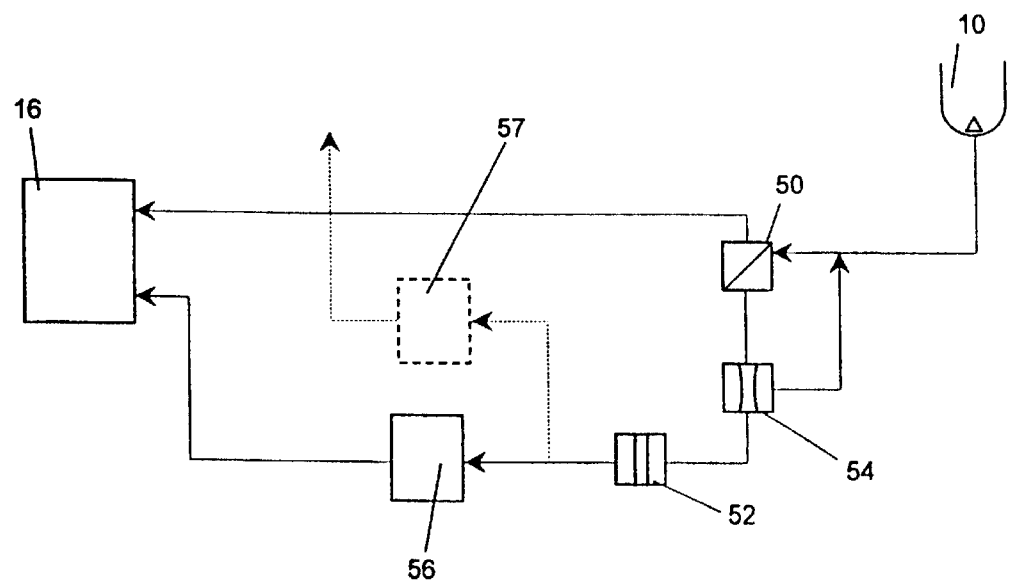
FIG. 3 illustrates a broke treatment system according to another preferred embodiment of the invention.

FIG. 3 illustrates an embodiment in which the embodiment of FIG. 2 has been modified by adding to it concentration 54 of the mineral fraction obtained from fractionation 50 to a higher concentration. The mineral fraction, i.e. coating flakes, may be concentrated for example with a hydrocyclone and/or lamella clarifier or by using both in series, and combined for example with ultra filtering. Filtrate from the concentration stage is recycled to dilute the broke pulp prior to fractionation 50 which gives the low consistency required in fractionation. After concentration 54 the mineral fraction is transported to a disintegrator 52 and after that to a mixing tank 56 of filler/coating material and from there further to the desired location in the paper manufacturing process. The disintegrated coating fraction still is at the same high concentration to which it was concentrated before the disintegration 52 and thus it may be introduced to the paper machine system at the high concentration and as a controlled flow instead of/in addition to fresh filler/coating material. FIG. 3 illustrates a method of recycling disintegrated pigment material to the process by guiding it from the disintegration 52 to the mixing of filler 56, where it is mixed with fresh filler and reused the same way as fresh filler. The disintegrated pigment material may be guided after the disintegrator 52 also to a pigment dosing system 57 where it is mixed with fresh pigment and guided further to be used in a paper coating stage. The methods of recycling regenerated pigment material to the paper manufacturing process illustrated in FIGS. 2 and 3 are in no way dependent on the embodiments of the invention described here as examples, only, but they may be used in connection with any embodiment.

Figure 4:
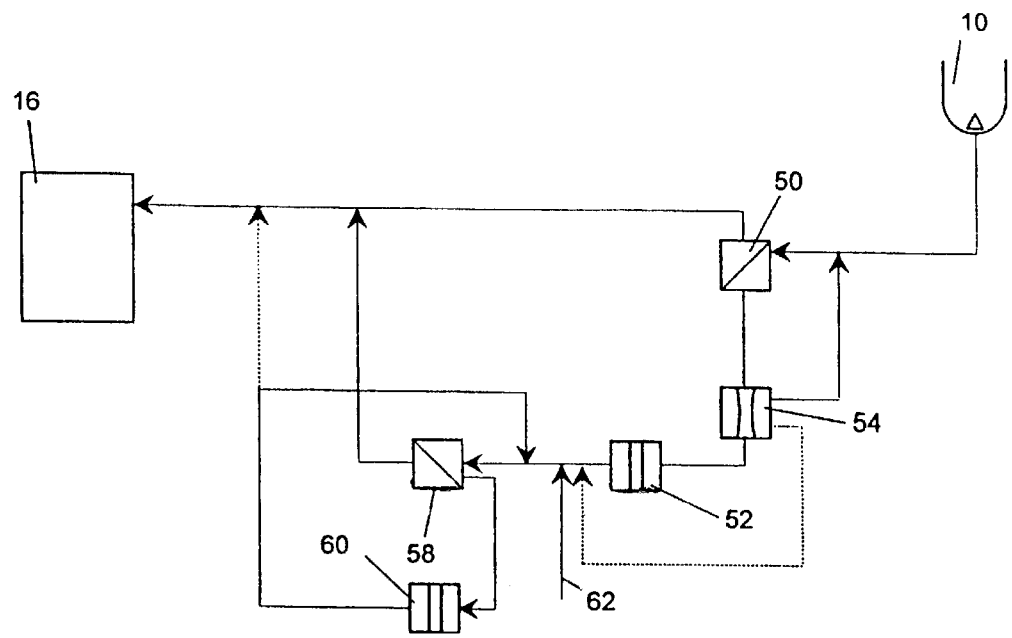
FIG. 4 illustrates a broke treatment system according to a third preferred embodiment of the invention.

FIG. 4 illustrates an embodiment in which the first disintegration stage 52 is followed by a second fractionator 58.

This fractionator 58 divides the mineral fraction obtained from the first disintegrating stage 52 into fine accept which is recycled/dosed as such to the paper manufacturing process, and into reject, which is guided to a disintegrator 60 of the second stage for further treatment. Mineral fraction which has passed through the second disintegrating stage 60 is recycled to the rest of the mineral fraction before the second stage fractionation 58 or alternatively it is reused directly. If concentration 54 is used before the first disintegrating stage 52, the mineral fraction must be diluted prior to the second fractionation stage 58 for example with filtrate from the concentration 54 or with liquid 62 introduced from a source external of the broke treatment system.

Of course also in this or any other embodiment, concentration may be used to get a higher concentration of the mineral material. The concentration may be located for example in the treatment of the reject from the second fractionation 58 whereby the mineral fraction flowing to the disintegrator 60 already has a higher concentration and the disintegrating process becomes easier, or in the treatment of the accept from the second fractionation 58 whereby the concentration of the disintegrated mineral material to be recycled to the paper manufacturing process is higher. The concentration of the treated mineral material desired depend on the point of the paper manufacturing process into which the material is introduced. The treated mineral material may for example be fed/dosed directly to the pulp in which case the concentration of the material is not of great importance, or the treated mineral material may be combined with fresh filler before it is dosed to the pulp or fresh filler before guiding it to a coater.

Filtrates produced in the concentration may of course be used also in other ways than described above. For instance, the reject concentration filtrate from the second stage fractionation may be used in the dilution required in the second stage fractionation and thus liquid may be efficiently recycled in the process.

Figure 5:
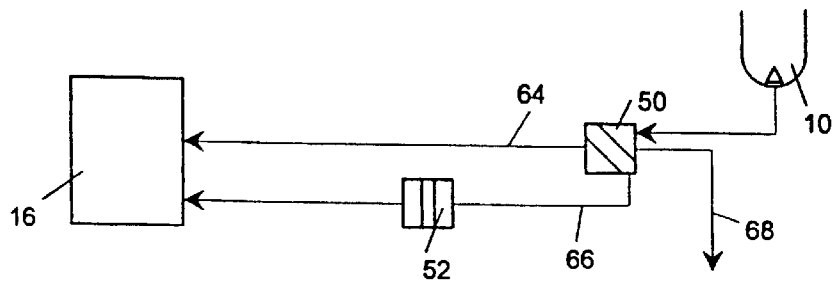
FIG. 5 illustrates a broke treatment system according to a fourth preferred embodiment of the invention.

In the broke treatment system of the invention, no reject to be transported to a dump is necessarily produced at all. However, sometimes it may be necessary to remove very coarse fraction from the process which otherwise would disturb the process. FIG. 5 illustrates an embodiment in which the first screening stage 50 employs a two-staged fractionator which classifies the broke pulp into accept 64, fine reject 66 and very coarse fraction 68. Accept, i.e. fiber fraction 64 from the two-staged fractionator 50 is guided to the paper manufacturing process, the fine fraction or mineral fraction 66 is guided to further treatment and the very coarse reject 68 is discharged from the process. Large non-dispersed impurities which have ended up in the broke pulp are removed from the process as the very coarse reject. A two-staged fractionator may of course be used in any broke fractionating stage.

Although some figures illustrating embodiments of the invention indicate that treated pigment material is returned to the broke pulp before the short circulation of the paper machine, and some indicate that it is mixed with fresh filler before it is recycled to the paper manufacturing process itself, the method of recycling the treated pigment to the process and the point where it is returned, are not in any way limited to the embodiments illustrated but various methods of recycling may be combined freely with any embodiment of the invention.

Coated broke produced in paper manufacturing processes is treated according to the invention by separating mineral fraction from it for separate treatment. According to the invention, the broke to be treated may be coated broke, alone, or alternatively also uncoated broke produces at the beginning of a paper machine and coated broke. Thus, coated broke may be treated separately or at least partly with uncoated broke.

The invention may be employed in treatment of broke from all paper or board manufacturing machines. In addition to the broke from the paper or board machine itself, also broke from external sources may be treated in the broke treatment system. Broke from an external source means in this context all unused paper brought to the paper machine or mill, for example broke from another machine, or unused paper or board which has been delivered to a customer but has been damaged before use for example during transportation, i.e. unprinted paper or board free from printing ink.

Only a few preferred embodiments of the invention have been described above and they are not meant to limit the invention in any way from its true scope of protection which is defined by the appended patent claims.

I claim:

1. A method of treating fiber based material containing minerals, during the manufacture of paper or board using a paper machine, comprising:

(a) supplying fiber-based raw materials for paper or board manufacture to a paper machine;

(b) collecting at least one of broke from paper manufacture and recyclable pulp to provide a fiber material containing minerals, and dispersing the fiber material to form a pulped fiber material;

(c) treating the pulped fiber material from (b), before the pulped fiber material is mixed with the paper or board manufacture fiber-based raw materials being supplied to the paper machine according to step (a), to disintegrate non-dispersed fractions therein to produce treated fiber material; and (d) mixing the treated fiber material obtained from step (c) with the paper or board manufacture fiber-based raw materials being fed to the paper machine according to step (a).

2. A method as recited in claim 1 wherein (c) is practiced before (d), and wherein (c) is practiced to disintegrate the mineral fraction of the fiber material.

3. A method as recited in claim 1, further comprising (e) fractionating the fiber material containing minerals from (b), and wherein step (e) is practiced before step (c).

4. A method as recited in claim 3, further comprising fractionating the mineral fraction of the fiber material to produce accepts and rejects, and utilizing the accepts from the fractionation of the mineral fraction in the manufacture of paper or board using the paper machine.

5. A method as recited in claim 4 further comprising disintegrating the reject fraction from the mineral fractionation.

6. A method as recited in claim 5 further comprising concentrating the mineral fraction before disintegration.

7. A method as recited in claim 5 further comprising concentrating the accepts after fractionation.

8. A method as recited in claim 7 wherein during concentrating of the accepts a filtrate is produced; and further comprising utilizing the filtrate from the concentrating of the accepts to dilute fiber pulp or mineral fraction to ultimately be fed to the paper machine.

9. A method as recited in claim 1, further comprising the steps of:

(e) fractionating the fiber material containing minerals from (b) before step (c) to produce an accepts stream which is substantially free of minerals and a rejects stream containing minerals, and wherein (d) is practiced by mixing the accepts stream from (e) with the raw materials from (a) being fed to the paper machine; and (f) treating according to step (c) the rejects stream obtained from (e), and then reusing the rejects stream as filler or coating material in the manufacture of paper or board using the paper machine.

10. A method as recited in claim 1 wherein (b) is practiced by collecting coated broke.

11. A method as recited in claim 1 wherein (b) is practiced by collecting both coated and uncoated broke.

12. A method as recited in claim 11 further comprising treating the coated and uncoated brokes separately before mixing thereof with the raw material in (a), and wherein (c) is practiced before (d).

13. A method as recited in claim 11 wherein (c) is practiced using both at least some coated and uncoated broke in the same treatment.

14. A method as recited in claim 1 wherein (b) is practiced using broke from a source external of the paper machine.

15. A method as recited in claim 1 wherein (c) is practiced to disintegrate at least the mineral fraction of the material.

16. A method as recited in claim 15 further comprising dosing the disintegrated mineral fraction to the paper machine.

17. Apparatus for treatment of fiber material containing minerals, comprising:

(i) a paper machine for producing paper or board;

(ii) means for collecting at least one of coated broke from paper manufacture, uncoated broke from paper manufacture, and recycled pulp;

(iii) means for mixing material collected by said collecting means into a flow of raw material to said paper machine;

(iv) means for dispersing the material collected by said collecting means into fiber pulp; and (v) between said dispersing means and said mixing means, means for disintegrating non-dispersed fractions of the fiber material so as to produce a treated fiber material in which non-dispersed fractions therein are disintegrated before being mixed with the raw material in said mixing means.

18. Apparatus as recited in claim 17 further comprising means for fractionating the fiber material into accepted fiber fraction and rejected mineral fraction downstream of said dispersing means.

19. Apparatus as recited in claim 18 further comprising at least one disintegrater for treating the rejected mineral fraction.

20. Apparatus as recited in claim 17 wherein said disintegrating means comprises means for disintegrating rejected mineral fraction from the fiber material.

21. Apparatus as recited in claim 17 wherein said means for disintegrating comprises at least one disintegrater and at least one fractionator.

22. Apparatus as recited in claim 21 wherein said at least one fractionator comprises a two-stage fractionator.

23. Apparatus as recited in claim 21 further comprising means for concentrating the reject fraction.

24. Apparatus as recited in claim 23 wherein said reject concentrating means is located after said at least one fractionator and before said at least one disintegrater.

* * * * *